S. RADIMAK.
TREE SAWING MACHINE.
APPLICATION FILED OCT. 9, 1920.

1,399,274.

Patented Dec. 6, 1921.

INVENTOR.
Steven Radimak
BY Zoltan A. Polacheck
ATTORNEY.

UNITED STATES PATENT OFFICE.

STEVEN RADIMAK, OF NEW YORK, N. Y.

TREE-SAWING MACHINE.

1,399,274.  Specification of Letters Patent.  Patented Dec. 6, 1921.

Application filed October 9, 1920. Serial No. 415,886.

*To all whom it may concern:*

Be it known that I, STEVEN RADIMAK, citizen of Hungary, residing at New York, in the county of New York and State of New York, have invented certain new and useful Improvements in Tree-Sawing Machines, of which the following is a specification.

This invention relates to power saws, having more particular reference to a saw intended for use in sawing down trees and afterward cutting the same into lengths as desired.

The invention has for an object to provide an improved construction of power saw which may be readily applied to a tree and will operate conveniently both on large and small trees.

More specifically the invention has for an object to provide an improved construction whereby a reciprocating saw may be both reciprocated across the tree and advanced into the cut as the latter deepens.

For further comprehension of the invention, and of the objects and advantages thereof, reference will be had to the following description and accompanying drawings, and to the appended claims in which the various novel features of the invention are more particularly set forth.

Figure 1 of the drawings is a plan view of the power saw constructed according to my invention, showing it applied to a tree.

Figure 1:
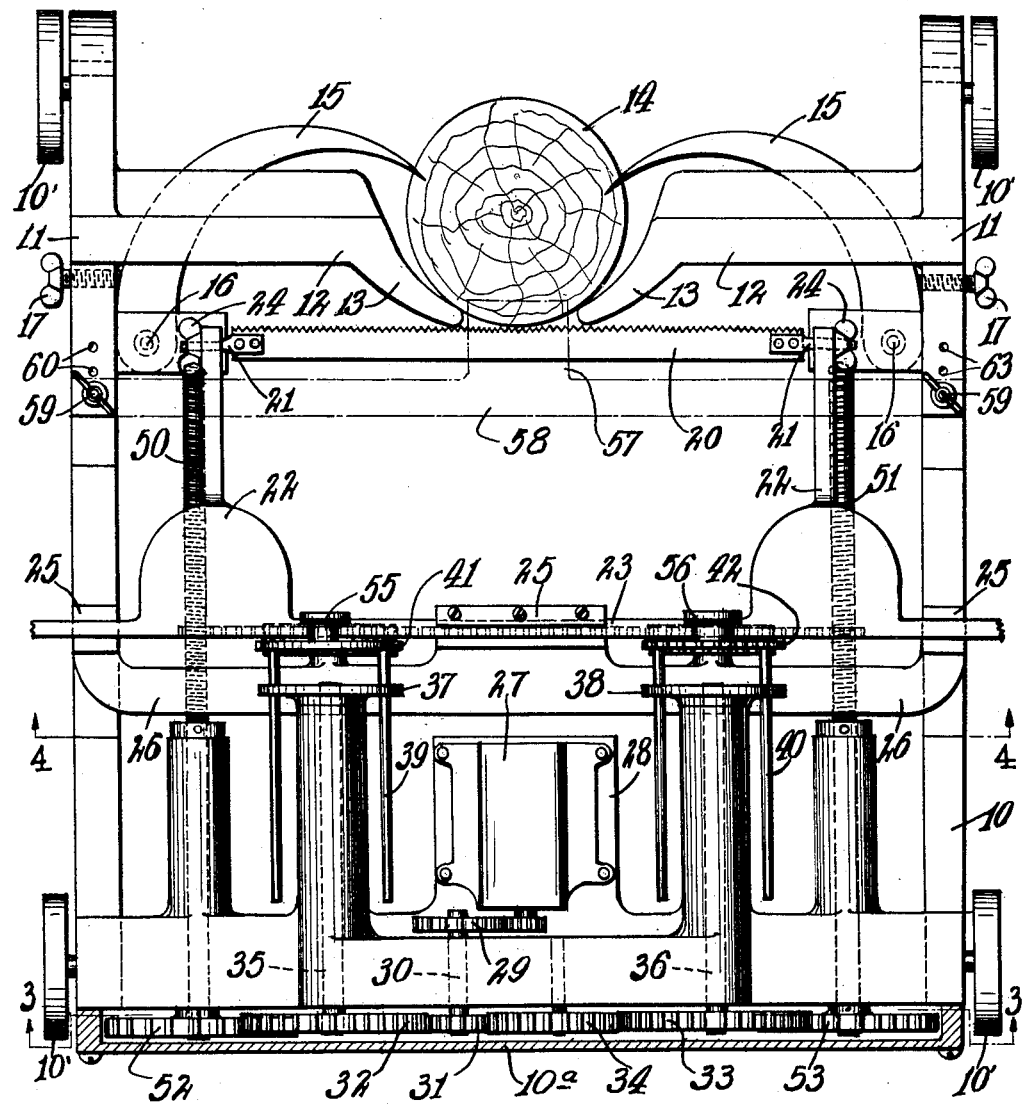

As here shown my improved power saw comprises a substantially rectangular base frame 10 having upstanding side pieces 11 at one end thereof. These side pieces 11 have transversely extending rigid arms 12 at their upper ends, these arms extending toward one another and terminating at adjacent ends in curved fingers 13 which are adapted to bear against the tree, the latter being indicated at 14. Coöperating with these fingers 13 to rigidly clamp the saw frame to the tree are a pair of curved gripper arms 15 which are pivoted at one end as at 16 to the frame 10. The free ends of these grippers engage the tree and are forced into the latter by means of screws 17 threaded through the sides of the frame and bearing against the grippers. The frame may be mounted on wheels 10′.

The saw blade is indicated at 20 and may be of the general type used in tree cutting and is here shown as having a pair of rigid screw elements 21 extending from opposite ends thereof and passing freely through the ends of a pair of arms 22 projecting rigidly forwardly from a transverse slide 23, nuts 24 being threaded on the ends of the screw elements 21 and bearing against the outer faces of the arms to properly tension the saw blade.

The slide 23 extends transversely from side to side of the frame 10 and is slidably mounted in suitable guide elements 25 on a crosshead 26 to which further reference will be made, this slide 23 being reciprocated to move the saw back and forth across the tree, and being moved transversely to itself to advance the saw into the cut, the means for reciprocating and advancing the saw being preferably driven from a motor 27 of any suitable type mounted on a platform 28 suitably supported by the frame 10.

Referring first to the means for reciprocating the saw, the motor 27 is connected by the reducing gearing 29 with a shaft 30 on which is fixed a pinion 31 which drives a pair of gears 32 and 33, the gear 32 being driven directly and the gear 33 through the medium of an idler 34. These gears 32 and 33 are fixed on the rear ends of a pair of longitudinal shafts 35 and 36 suitably supported in the frame 10, it being obvious that these shafts will be driven in opposite directions.

Upon the forward ends of these shafts 35 and 36 are fixed a pair of disks 37 and 38, these disks having suitable apertures therein to slidably support the series of rods 39 and 40 having mutilated gears 41 and 42 on their forward ends. As will be apparent the gears 41 and 42 may have longitudinal movement on the frame while still maintaining rotative engagement with the shafts 35 and 36.

Figure 4:
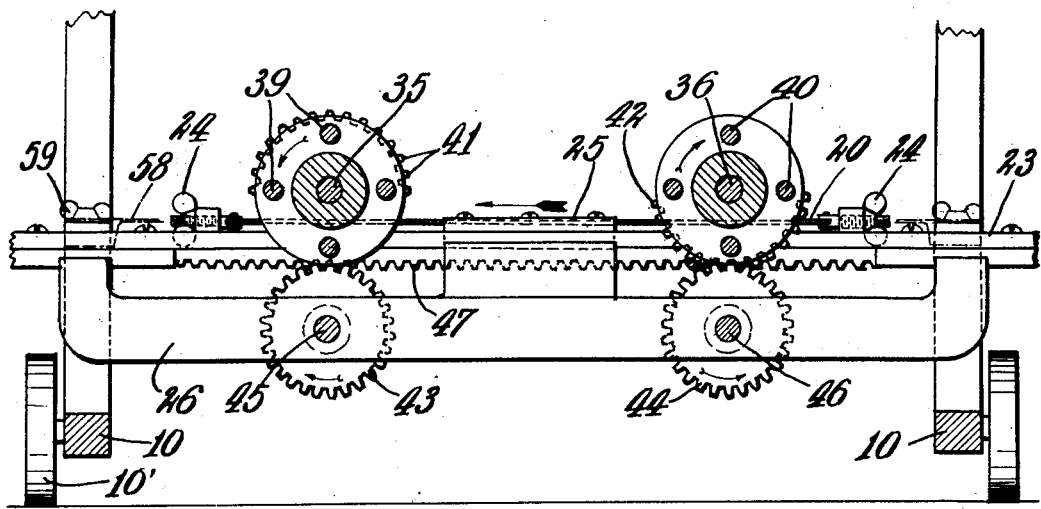
Fig. 4 is a transverse section on the line 4—4 of Fig. 2.

The teeth on each of the gears 41 and 42 preferably extend through an arc of 180° and are adapted to mesh with a second pair of gears 43 and 44 mounted on stub shafts 45 and 46 on the crosshead 26, these gears 43 and 44 having widened faces and meshing also with rack teeth 47 formed on the underside of the slide 23. As shown clearly in Fig. 4 the teeth on the gears 41 and 42 have an opposed relation with each other whereby they alternately engage and disengage from the gears 43, 44. It will be quite apparent that when the teeth on gear 41 are meshing with gear 43, the saw 20 will be moved in one direction, and when the teeth on gear 42 are engaging gear 42 the saw will be moved in an opposite direction.

Figure 2:
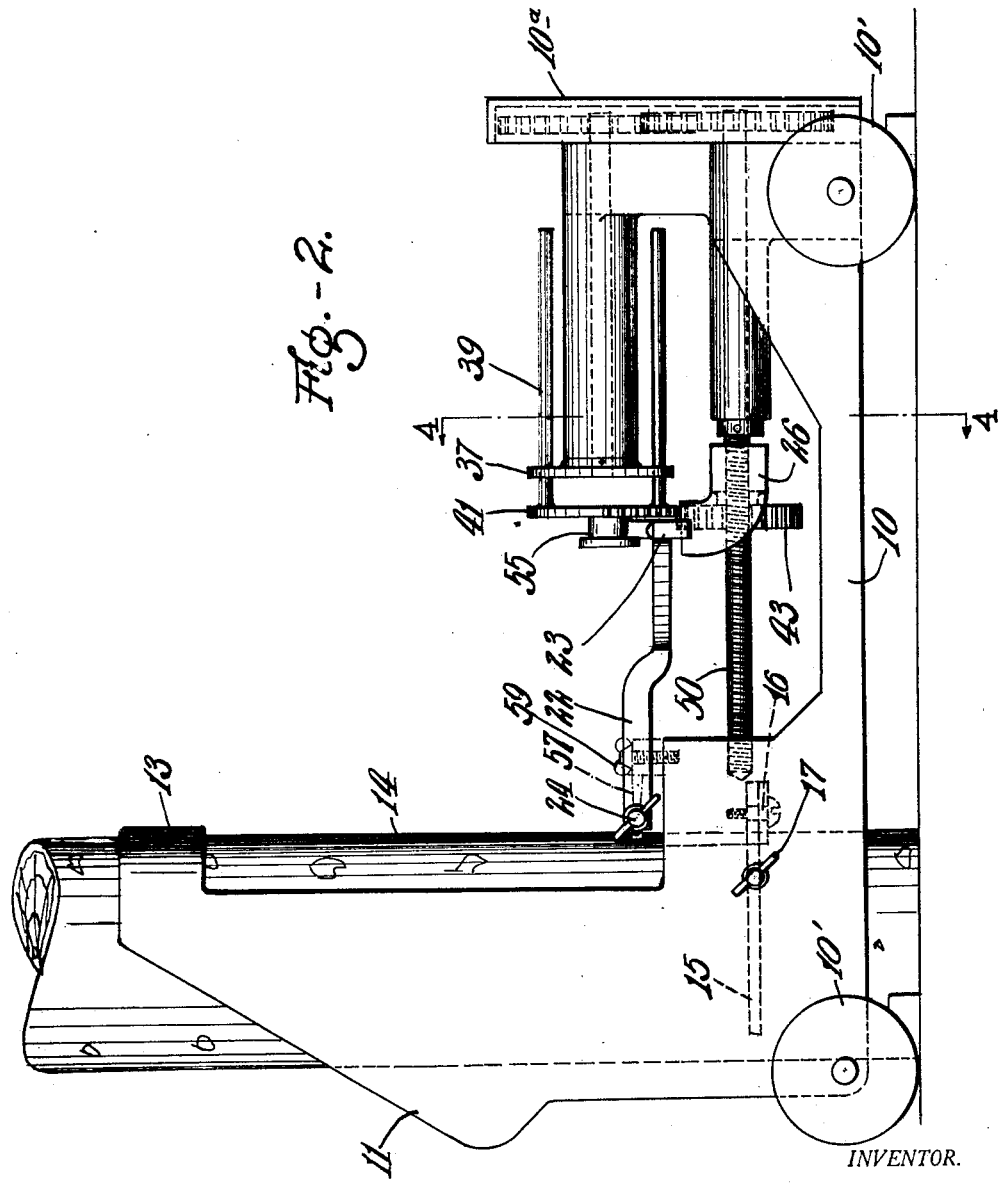
Fig. 2 is a side elevation thereof.
Figure 3:
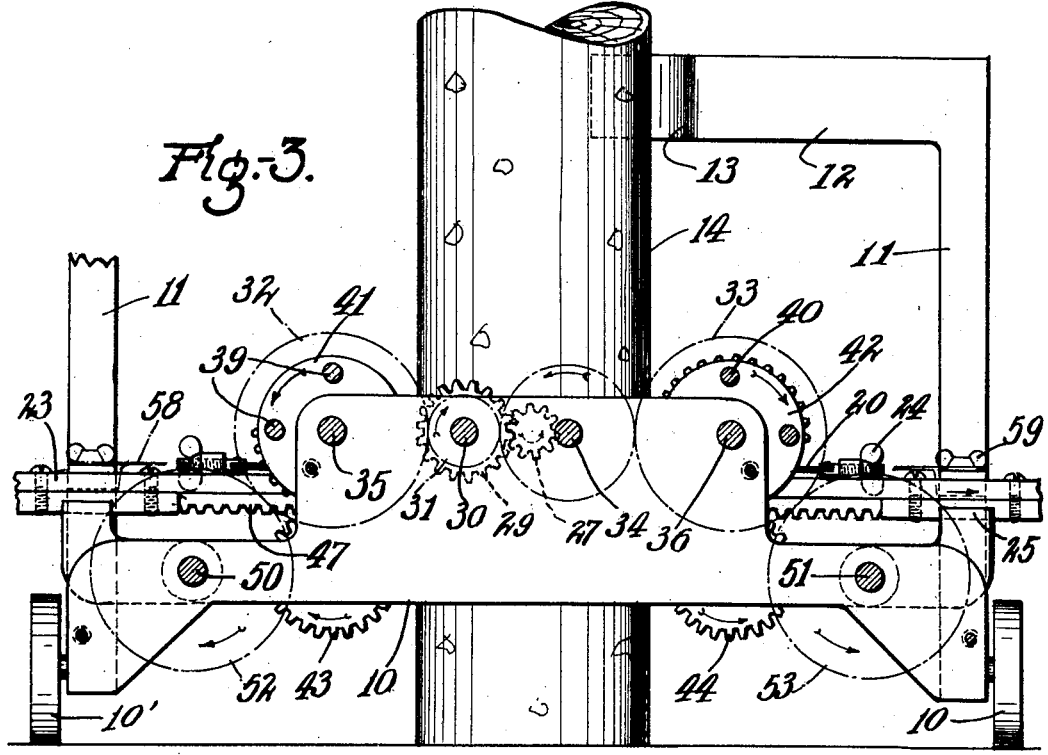
Fig. 3 is a transverse section on the line 4—4 of Fig. 1.

To advance the saw to the work I provide a pair of threaded shafts 50 and 51 supported at opposite ends in bearings on the frame 10. These shafts carry the cross head 26 and pass through correspondingly threaded apertures in the latter whereby rotation of the shafts moves the latter toward the tree, these shafts being driven by means of gears 52 and 53 on their rear ends which mesh with the gears 32 and 33. The gears 31, 32, 33, 34, 52 and 53 may be inclosed in a suitable housing 10$^a$ as shown. In order to cause the mutilated gears 41 and 42 to move forward and maintain engagement with the gears 43 and 44 on the crosshead 26, these gears may have grooved bosses 55 and 56 engaging the slide 23 as shown in Fig. 2.

To prevent the cut closing upon the saw 20 I provide a wedge element 57 which is inserted into the cut behind the saw, this wedge element being carried on a cross bar 58 adapted to be adjustably fixed on the frame 10 by bolts 59 which may be inserted into the desired one of a series of apertures 60 in the frame.

In the operation of my improved power saw the same is first advanced to the tree until the fingers 13 engage the latter, the grippers 15 being then swung in to firmly grip the tree. When motor 27 is started the mutilated gears 41 and 42 are caused to rotate in opposite directions and the teeth thereof, by alternately engaging the gears 43 and 44, move the slide 23, upon which the saw blade 20 is carried, back and forth. At the same time the shafts 50 and 51 are rotating and feeding the crosshead 26, which carries the slide, toward the tree and causing the saw to advance into the cut.

Having thus described my invention what I claim as new and desire to protect by Letters Patent of the United States is as follows:

1. In a power saw, a saw blade, a slide on which said saw blade is mounted, means for advancing said slide transversely to itself, means for reciprocating said slide to move the saw back and forth across the work, said means including mutilated gears adapted to alternately have operative relation to the slide, shafts fixed against longitudinal movement for rotating said gears, and means adapted to permit said gears to advance with the slide while maintaining rotative engagement with said shaft.

2. In a power saw, a saw blade, a slide on which said saw blade is mounted, means for advancing said slide transversely to itself, means for reciprocating said slide to move the saw back and forth across the work, said means including mutilated gears adapted to alternately have operative relation to the slide, shafts fixed against longitudinal movement for rotating said gears, and means adapted to permit said gears to advance with the slide while maintaining rotative engagement with said shaft, said means including apertured disks fixed to said shafts, and rods fixed to said disks and passing freely through the apertures in said disks.

In testimony whereof I have affixed my signature.

STEVEN RADIMAK.